(12) United States Patent
Krabbe

(10) Patent No.: US 12,590,667 B2
(45) Date of Patent: Mar. 31, 2026

(54) HEIGHT ADJUSTABLE HOLDER FOR A MULTIPLATE

(71) Applicant: ERGONOMIC SOLUTIONS INTERNATIONAL LIMITED, Epsom (GB)

(72) Inventor: Per Krabbe, Aabybro (DK)

(73) Assignee: ERGONOMIC SOLUTIONS INTERNATIONAL LIMITED, Epsom (GB)

( * ) Notice: Subject to any disclaimer, the term of this patent is extended or adjusted under 35 U.S.C. 154(b) by 0 days.

(21) Appl. No.: 18/267,582

(22) PCT Filed: Dec. 17, 2021

(86) PCT No.: PCT/EP2021/086461
§ 371 (c)(1),
(2) Date: Jun. 15, 2023

(87) PCT Pub. No.: WO2022/129507
PCT Pub. Date: Jun. 23, 2022

(65) Prior Publication Data
US 2024/0052970 A1 Feb. 15, 2024

(30) Foreign Application Priority Data
Dec. 18, 2020 (DK) ............................ PA 2020 70853

(51) Int. Cl.
*F16M 11/04* (2006.01)
*F16M 11/10* (2006.01)
(Continued)

(52) U.S. Cl.
CPC ......... *F16M 11/046* (2013.01); *F16M 11/048* (2013.01); *F16M 11/10* (2013.01); *F16M 11/2014* (2013.01); *G07F 7/088* (2013.01)

(58) Field of Classification Search
CPC .... F16M 11/046; F16M 11/048; F16M 11/10; F16M 11/2014; F16M 2200/025; F16B 2/12
(Continued)

(56) References Cited

U.S. PATENT DOCUMENTS

| | | | |
|---|---|---|---|
| 6,012,693 A | 1/2000 | Voeller et al. | |
| 7,410,143 B2 * | 8/2008 | Chen .................. | F16M 11/2078 |
| | | | 248/422 |

(Continued)

FOREIGN PATENT DOCUMENTS

| | | |
|---|---|---|
| CA | 3086450 A1 | 1/2021 |
| EP | 2397743 A2 | 12/2011 |
| GB | 2 542 914 A | 4/2017 |

OTHER PUBLICATIONS

International Search Report for PCT/EP2021/086461 mailed Apr. 26, 2022.
Written Opinion for PCT/EP2021/086461 mailed Apr. 26, 2022.

*Primary Examiner* — Christopher Garft
(74) *Attorney, Agent, or Firm* — Schmeiser, Olsen & Watts, LLP

(57) ABSTRACT

A height adjustable holder for a multiplate suitable to carry various types of electronic terminals is provided including: d. a base plate having a plurality of apertures in an array through the base plate or a plurality of upstanding ridges; e. a multiplate, slidingly arranged covering the overside of the base plate, where sliding surfaces are arranged between the base plate and the multiplate; f. a manipulation handle arranged between the base plate and the multiplate, which manipulation handle in a first end extends beyond the multiplate, and in an opposite end is provided with a hook portion, where the distal end of the hook, faces the base plate, and where a pivot is between the multiplate and the manipulation handle whereby the hook may be brought into
(Continued)

engagement with an aperture or a ridge, thereby arresting the multiplate's sliding ability in one direction relative to the base plate.

9 Claims, 3 Drawing Sheets

(51) Int. Cl.
*F16M 11/20* (2006.01)
*G07F 7/08* (2006.01)

(58) Field of Classification Search
USPC .......................................................... 248/161
See application file for complete search history.

(56) References Cited

U.S. PATENT DOCUMENTS

| | | | | |
|---|---|---|---|---|
| 7,850,132 | B2 * | 12/2010 | Chen ...................... | F16M 11/16 |
| | | | | 248/676 |
| 8,659,884 | B2 * | 2/2014 | Segar ..................... | F16M 11/22 |
| | | | | 361/679.22 |
| 9,547,850 | B1 * | 1/2017 | Singgih ................ | F16M 11/046 |
| 9,907,416 | B1 | 3/2018 | Taylor et al. | |
| 10,208,777 | B1 * | 2/2019 | Brassard .............. | F16M 11/041 |
| 11,135,473 | B2 * | 10/2021 | Gettle ..................... | H04M 1/04 |
| 2005/0253040 | A1 | 11/2005 | Yang | |
| 2006/0198094 | A1 | 9/2006 | Kano et al. | |
| 2007/0205345 | A1 * | 9/2007 | Chen ...................... | F16M 11/24 |
| | | | | 248/297.31 |
| 2009/0321591 | A1 * | 12/2009 | Chen ...................... | F16M 11/10 |
| | | | | 248/161 |
| 2010/0012810 | A1 | 1/2010 | Hu | |
| 2012/0019990 | A1 * | 1/2012 | Segar ..................... | F16M 11/24 |
| | | | | 361/679.01 |
| 2016/0252206 | A1 * | 9/2016 | Segar ..................... | F16M 11/42 |
| | | | | 248/125.1 |
| 2017/0039537 | A1 | 2/2017 | Singgih et al. | |
| 2017/0050580 | A1 * | 2/2017 | Bernert .............. | B60R 11/0252 |
| 2017/0265313 | A1 * | 9/2017 | Deng ...................... | F16C 11/10 |
| 2018/0094766 | A1 * | 4/2018 | Yoon ................. | F16M 11/2014 |
| 2018/0142833 | A1 | 5/2018 | Sasson et al. | |
| 2019/0187754 | A1 * | 6/2019 | Janzen .................... | A47F 10/02 |
| 2019/0376639 | A1 * | 12/2019 | Bowman ............... | F16M 11/24 |
| 2020/0398106 | A1 * | 12/2020 | Gettle ............... | A63B 22/0046 |
| 2021/0278029 | A1 * | 9/2021 | Ho ........................ | F16M 11/046 |
| 2024/0369177 | A1 * | 11/2024 | Krabbe ............... | F16M 11/046 |

* cited by examiner

HEIGHT ADJUSTABLE HOLDER FOR A MULTIPLATE

CROSS-REFERENCE TO RELATED APPLICATIONS

This application claims priority to PCT Application No. PCT/EP2021/086461, having a filing date of Dec. 17, 2021, which is based DK application No. PA 2020 70853, having a filing date of Dec. 18, 2020, the entire contents both of which are hereby incorporated by reference.

FIELD OF TECHNOLOGY

The following is directed to a height adjustable holder for a multiplate suitable to carry various types of electronic terminals. The following also discloses a method of adjusting a height adjustable holder.

BACKGROUND

In the field of electronic terminals, which for the main part will be electronic payment terminals, it is well known to mount them on holders. The holders are usually positioned such that a user passing, for example through a checkout lane, can easily and in an ergonomic manner reach the terminal, place the credit card, and enter the required codes. These holders are typically stationary, such that they are arranged in a fixed position, although some of them might pivot slightly from side to side in order to provide the user with a certain degree of privacy then entering secret codes.

It is also known to provide the payment terminals on holders which may be extended, for example for use in drive through facilities where it is desirable to be able to extend the payment terminal towards a customer in a vehicle and after end of transaction retrieve the payment terminal inside the drive through facility.

An example of a mounting for a payment terminal which may be moved is disclosed in U.S. Pat. No. 9,907,416. In this construction the payment terminal is mounted on a plate which may slide relative to an underlying plate, and where a lock may be activated in order to lock the two plates in their mutual positions. Furthermore, a spring member is arranged between the two plates urging the payment terminal back to the original (higher) position.

SUMMARY

However, for people using for example wheelchairs the electronic terminals positioned, for example in checkout facilities in a supermarket, are usually arranged at an elevated level relative to the seated user, such that the use of the terminal becomes extremely cumbersome. Adding to the embarrassment, the user often also has a physical handicap which creates a substantial difficulty in carrying out what normal people would consider as a normal transaction. In order to address this, it has been known to attach terminals to interfaces and then when a wheelchair user passes through the checkout lane, detach the electronic terminal from the holder, and pass it to the user. Usually, a cable or wire is attached to the terminal in order to prevent theft or damage due to the terminal falling on the floor. These systems, however, have the draw back that they are very difficult to handle doing a busy checkout lane, in that they need to be passed to the user, and retrieved, and thereafter repositioned in the holder, and often locked in the holder, before the following client may use the payment terminal. Also, the wire or cable needs special attention in order not to interfere with, for example, shopping carts or other devices on the customers side, and with the checkout lane as such on the checkout lane side.

An aspect relates to a system whereby the electronic terminals may be positioned both at a normal level but also be able to be manipulated to a desired (lower) level in order to service for example users in wheelchairs.

Embodiments of the present invention address this by providing a height adjustable holder for a multiplate suitable to carry various types of electronic terminals where the holder comprises:

a. a base plate provided with one or more brackets are provided on an underside of the base plate, suitable for attaching the base plate to an arm, and where a plurality of apertures are provided in an array through the base plate or a plurality of upstanding ridges are provided upstanding from an overside of the base plate;

b. a multiplate, slidingly arranged covering the overside of the base plate, where sliding surfaces are arranged between the base plate and the multiplate such that the multiplate may be displaced relative to the base plate; and c. a manipulation handle arranged between the base plate and the multiplate, which manipulation handle in a first end extends beyond the multiplate, and in an opposite end is provided with a hook portion, where the distal end of the hook, faces the base plate, and where a pivot is arranged between the multiplate and the manipulation handle whereby the hook may be brought into engagement with an aperture or a ridge on the base plate, thereby arresting the multiplate's sliding ability in one direction relative to the base plate.

Where this construction is provided, the electronic device remains in its safe and secure holder but may be manipulated by a user into a desired position, such that the transaction may be carried out in a convenient, ergonomically and secure manner. The multiplate is suitable to carry various types of electronic terminals is provided, such that various and different payment terminals may, due to the use of the multiplate, be arranged on the holder. It is well-known in the field to provide various interface plates for various electronic payment terminals, such that a specific payment terminal when using an interface plate may be mounted in a multiplate on a fixed holding system. With embodiments of the present invention, the multiplate is provided in order to allow a large variety of various electronic terminals, such as for example payment terminals, to be mounted simply by selecting the correct interface plate. As these interface plates are well-known in the field and varies in type and model of electronic terminals, they are considered outside the scope of embodiments of the present invention, however the interface plate should be provided with engagement means suitable to engage and attach the electronic terminal to the multiplate of embodiments of the present invention. Also, as will be evident below, the specific multiplates suitable for use with embodiments of the present invention have distinct features. For this purpose, the multiplate is provided with various features, which will be explained below, in order to engage and hold, in a safe and secure manner, a host of the well-known interface plates already in use.

By providing brackets on the base plate, it is possible to fasten the height adjustable holder by well-known means to already existing holding systems, such as for example provided by Ergonomic Solutions.

The multiplate is slidingly arranged covering the overside of the base plate. In connection with this, it should be considered that any terms or words indicating an orientation of a feature must be related to the use situation. Consequently, in use the multiplate will be superposed the base plate and provided with means for sliding relative to the base plate. In between the base plate and the multiplate there will be provided a space and in this space a manipulation handle is arranged, such that by manipulating the handle a hook portion, opposite the end to which the user will manipulate the manipulation handle, is able to engage the apertures or upstanding ridges provided in the base plate. As the hook engages the apertures or ridges the multiplate will be arrested relative to the base plate, such that the sliding movement of the multiplate relative to the base plate will be impossible. Naturally, by further manipulating the handle it is possible to disengage the hook portion from the aperture or the ridge in order to allow the multiplate to slide relative to the base plate. The reverse sliding movement is interesting in order to bring the multiplate, and thereby the electronic terminal, back to the normal use position.

In a further embodiment of the invention, the pivot is made by a bent section in the multiplate, where the bent section is at approx. 90 degrees to the multiplate, towards the base plate, the bent section having an aperture, and where the manipulation handle is inserted through the aperture, and provided with arresting means on either side of the bent section, whereby the manipulation handle cannot be removed, but only pivot around the rim of the aperture in the bent section.

This is a relatively simple mechanical construction, but nevertheless, in practice it is very stable, robust and does provide the desired effect. The stem of the manipulation handle, i.e., the section between the handle in one end of the manipulation handle and the hook in the opposite end, is passed through the aperture in the bent section. At this time, arresting means, typically in the shape of bolts, are arranged such that one arresting means is positioned on either side of the aperture, on the manipulation handle. In this manner, once the arresting means are installed on the manipulation handle it is impossible, to withdraw the manipulation handle from the aperture in the bent section. In this manner, the manipulation handle is pivotally installed between the base plate and the multiplate, and as such may pivot around the aperture in order to engage and disengage the apertures or the ridges provided in the base plate.

Naturally, in a further embodiment of the invention, resilient means are provided between the manipulation handle and the multiplate, the resilient means being positioned between the bent section and the hook section, urging the manipulation handle away from the multiplate. By providing the resilient means the hook section will be urged into engagement with the apertures or ridges provided in the base plate in order to maintain the relative position of the multiplate relative to the base plate.

The hook section of the manipulation handle may be bent at an angel smaller than 90 degrees, such that once a user has manipulated the manipulation handle and effected the sliding action between the base plate and the multiplate to a lower position than the normal position, a simple pushing of the multiplate may cause the hook to slide out of the engagement with the aperture or ridge, and in this manner, by pushing the multiplate, it is possible to allow the hook to travel in one direction, whereas travel in the other direction is hampered by the hooks engagement with the aperture or the ridge particularly as the hook may be bent towards the sliding direction. When sliding the multiplate back into the normal high position relative to the base plate the hook will perform a bouncing motion as it passes the apertures/ridges.

In a further embodiment, the base plate has a length and a width in a x-y plane, and where a portion along each longitudinal side of the base plate is bent an angle ß resp. −ß, relative to the x-y plane, and where the multiplate also has a length and a width in use in a second plane parallel to the x-y plane, where a portion along each longitudinal side is bent such that the bent portions of the multiplate are parallel with the bent portions of the base plate and the bent portions are overlapping, and where a low friction material is arranged in the overlap, whereby the base plate may slide relative to the multi plate, guided by the bent portions.

With this geometric arrangement of the oblique side portions, it is possible to overlay the multiplate on top of the base plate in such a manner that the oblique side portions of the base plate are at least partly covered by oblique side portions of the multiplate. It shall be understood such that the oblique portions are arranged substantially in parallel when the height adjustable holder is assembled. There is provided a slight distance between the oblique side portions in order to fit a friction reducing material between the two plates, i.e., the base plate and the multiplate. The fiction reducing material serve both to allow a smooth movement of the multiplate relative to the base plate but also to facilitate a smooth and substantially silent movement of the two sliding plates.

Embodiments of the invention are also directed to a method of adjusting a height adjustable holder, as disclosed above, where the special features of embodiments of the invention are used in order to achieve this.

BRIEF DESCRIPTION

Some of the embodiments will be described in detail, with references to the following Figures, wherein like designations denote like members, wherein.

DETAILED DESCRIPTION

Figure 1:
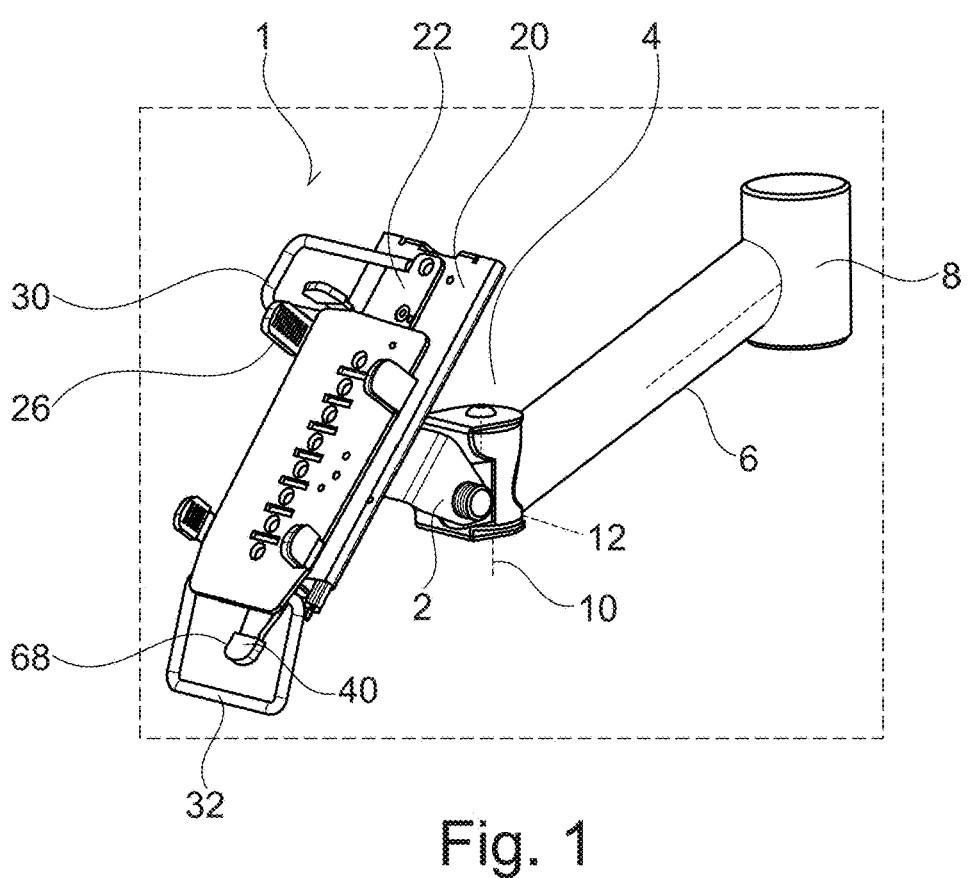
FIG. 1 illustrates a height adjustable holder for a multiplate suitable to carry various

In FIG. 1 a height adjustable holder for a multiplate suitable to carry various types of electronic terminals is illustrated. The height adjustable holder 1 is in this embodiment provided with a bracket 2, which again by means of a gimbal-like construction 4 attaches the height adjustable holder to an arm 6. In the other end of the arm to the gimbal device a socket 8 is provided such that the arm, gimbal and height adjustable holder may be mounted on a post for example in connection with a payment station in a cashiers' lane.

The gimbal allows the height adjustable holder to be manipulated by pivoting the height adjustable holder around the two axis 10, 12 in a well-known manner.

Returning the height adjustable holder 1, the holder is provided with a multiplate 20. The multiplate is provided with means, in the depicted embodiment with a rail 22, which allows specific adapter plates 24 to be mounted on the multiplate 20. The adapter plate 24 may be constructed such that an electronic device (not depicted) may be arranged in the adapter plate. In this embodiment the adapter plate 24 is provided with a number of resilient tabs 26, whereby an electronic device of a certain size may be accommodated between the tabs on the adapter plate 24. Furthermore, the multiplate 20 is provided with a first handle 30 suitable to is manoeuvre the position of the height adjustable holder 1 into a correct angle or radial position. By manipulating the first handle 30 the gimbal 4 will be activated, wherever it is possible to adjust the angle of the height adjustable holder both with respect to a vertical axis and with respect to a horizontal axis.

A further second handle 32 is provided. This second handle 32 is connected to the multiplate 24 such that by pushing on the second handle 32 it will be possible to displace the multiplate 24 relative to a base plate 50 (FIG. 2) as will be discussed in more details below. Furthermore, the distal end 68 of a manipulation handle 40 is indicated, which will also be further discussed below.

Figure 2:
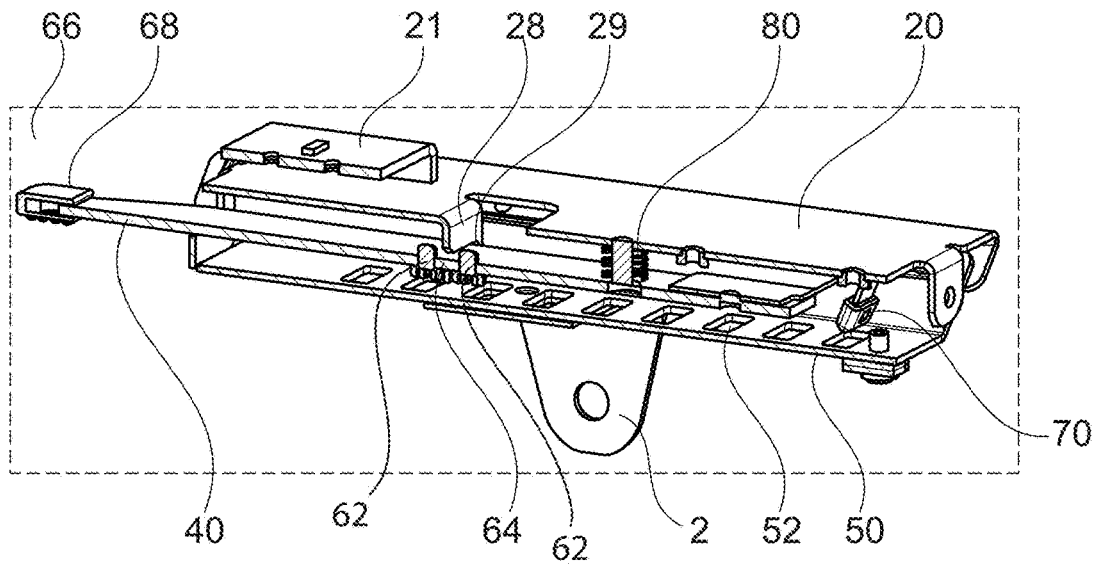
FIG. 2 illustrates a cross section through the height adjustable holder.

In FIG. 2 a cross section through the height adjustable holder 1 is illustrated. The same features as already discussed above are provided with the same reference numbers throughout the application.

As can be seen more clearly in the illustration in FIG. 2, where the adapter plate has been removed, the multiplate 20 is provided with an engagement bracket 21 making the multiplate suitable to receive the adapter plate 24 or any other adapter plate fitting with the engagement bracket 21. Alternatively, the engagement means provided on/in the multiplate may be threaded holes, hooks etc., depending on the means provided on the adapter plate for creating an engagement between the adapter plate and the multiplate. Typically, the multiplate will be provided with an assortment of possible engagement means such that various adapter plates can be fastened to the multiplate.

The bracket 2 is, as it is evident from the cross section in FIG. 2, fastened to a base plate 50. The base plate 50 is provided with an array of apertures 52. It is also contemplated that instead of apertures 52 the base plate may be provided with an array of ridges 52' crosswise relative to the longitudinal direction. The function of the apertures 52 (or the ridges, see FIG. 4) is to arrest the multiplate 20 relative to the base plate 50. For this purpose, a manipulation handle 40 is arranged between multiplate 20 and the base plate 50. The multiplate is provided with a bent section 28 in which an aperture 29 is provided. As may be seen from the cross section in FIG. 2, the bent section 28 is bent at an approximately 90 degrees' angle relative to the plane of the multiplate towards the base plate. The aperture 29 in the bent section 28 allows the manipulation handle 40 to be inserted through the aperture 29. On either side of the bent section/aperture 28, 29 arresting means 62 are provided in the shape of screws. The screws have an extend such that they project past the body of the manipulation handle and due to the arrangement on either side of the bent section 28 the arresting means 62 will make it impossible to withdraw the manipulation handle 40 from the aperture and thereby from the height adjustable holder. In this manner a pivot 64 is created such that the manipulation handle 40 may be pivoted around the rim of the aperture in the bent section due to its insertion through the aperture 29 and the arresting means 62, which avoids that the manipulation handle may be withdrawn from the placement in the aperture 29.

In a first end 66 of the manipulation handle 40 a handle 68 is provided, whereby a user may manipulate the manipulation handle 40 in order to position the multiplate relative to the base plate. In the opposite end of the manipulation handle 40 a hook section 70 is provided, which hook section 70 is created by simply bending the material of the manipulation handle 40 or attaching a special hook to the distal end of the manipulation handle. Due to the provision of the pivot between the hook section 70 and the handle 68 it is possible to move the hook section up and down simply by manipulating the handle, and when the handle is moved upwards towards the multiplate, the hook will move downwards, and if positioned correctly, the hook section 70 will engage one of the apertures 52 and in this manner stop any relative movement between the multiplate 20 and the base plate 50. If it becomes desirable to position the multiplate 20 in a different position relative to the base plate 50, the handle 68 may again be manipulated downward whereby the hook section 70 will disengage the aperture 52 and allow free sliding movement of the multiplate 20 relative to the base plate 50. A resilient device 80 is in this embodiment arranged between the underside of the multiplate and the manipulation handle 40 where the resilient device 80 urges the manipulation handle 40 away from the multiplate. In this manner, the hook section 70 will likewise be urged away from the multiplate and thereby into engagement with the apertures 52.

By further bending the hook section 70 into an oblique angle, as illustrated in FIG. 2, it is possible to slide the multiplate relative to the base plate simply by manipulating the second handle 32 (see FIG. 1), whereby the movement of the handle and thereby the multiplate 20 will cause the hook section 70, due to the oblique angle to be urged/forced out of the engagement with the aperture. This is caused by the rim of the aperture 52 sliding on the surface of the hook section, which due to the oblique angle will create an upwards movement of the hook section. Movement in the other direction will naturally cause the hook section to be forced even deeper into the aperture thereby further securing the engagement between the multiplate 20 and the base plate 50.

Figure 3:
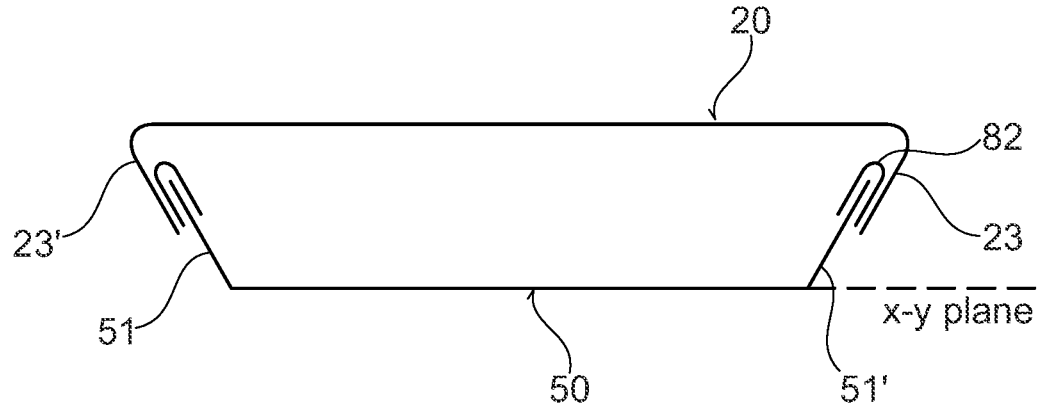
FIG. 3 illustrates a cross section perpendicular to the cross section in FIG. 2.

Turning to FIG. 3 a cross section perpendicular to the cross section in FIG. 2 is illustrated. In this illustration the base plate 50 and the multiplate 20 are illustrated as having their plane sections in an x-y plane. The plates 20, 50 are substantially parallel and arranged with a distance between them. In this space created by the distance between the multiplate 20 and the base plate 50 the manipulation handle 40 with a pivot 64 and resilient device 80 is arranged, as discussed above, but not illustrated in FIG. 3. Both the multiplate 20 and the base plate 50 are provided with bent portions 51, 51', 23, 23', respectively. The bent portions are clearly bent out of the x-y plane, but the bent portions along corresponding sides of the multiplate 20 and the base plate 50 will be bent to oblique angles, such that the bent side portions 51', 23 are parallel and the bent portions 51, 23' are parallel. In this manner by sliding the multiplate 20 over the base plate 50 it will be impossible to remove the multiplate from the base plate by moving the multiplate orthogonal to the x-y plane. By correctly dimensioning the plates, it is possible to provide a relatively tight fit, such that a guided and controlled sliding action may be provided between the multiplate 20 and the base plate 50. In order to further provide comfort and guidance low friction profiles 82 may be interspersed between the bent side portions 23, 51' and 23', 51.

Figure 4:
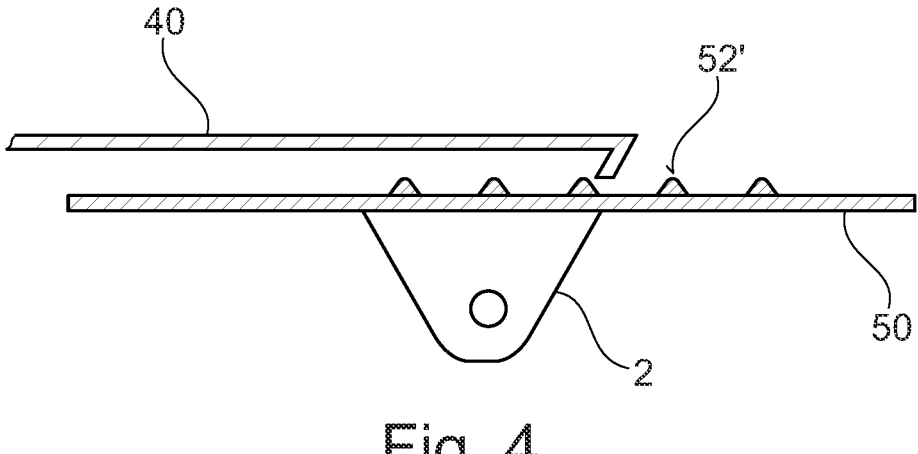
FIG. 4 illustrates an embodiment where the apertures are replaced by ridges.

In FIG. 4 is illustrated an embodiment where the apertures are replaced by ridges 52', such that the hook 70 engages the ridges 52' (instead of being arrested in the apertures).

Figure 5:
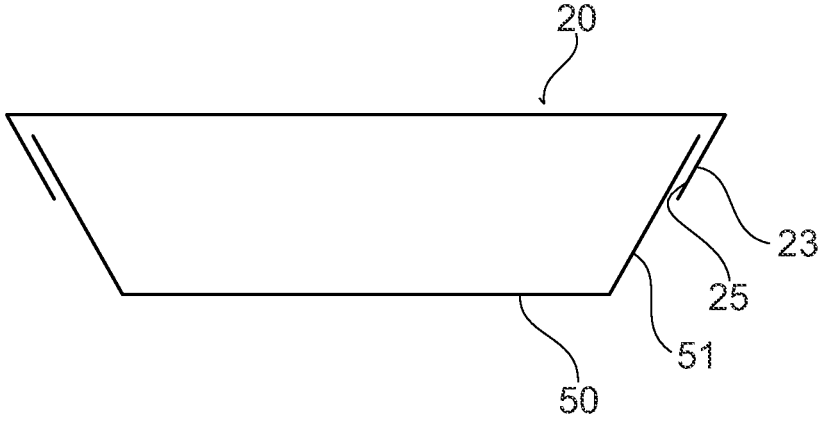
FIG. 5 schematically illustrates the sliding surfaces.

In FIG. 5 is schematically illustrated the sliding surfaces 25 between the bent side portions 23, 23', 51, 51'. It is contemplated that a separation layer may be inserted at 25 in order to lessen the friction between the bent side portions 23, 23', 51, 51', and enhance the user experience.

Although the present invention has been disclosed in the form of embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements. The mention of a "unit" or a "module" does not preclude the use of more than one unit or module.

The invention claimed is:

1. A height adjustable holder for a multiplate configured for mounting various types of electronic terminals wherein the holder comprises:

a. a base plate with one or more brackets on an underside of the base plate, configured for attaching the base plate to an arm, and wherein a plurality of apertures are provided in an array through the base plate or a plurality of upstanding ridges are provided upstanding from an overside of the base plate;

b. a multiplate slidingly arranged covering the overside of the base plate, wherein sliding surfaces are arranged between the base plate and the multiplate such that the multiplate may be displaced relative to the base plate, wherein the multiplate is configured for mounting of an electronic terminal and/or an adapter plate for the electronic terminal; and c. a manipulation handle arranged between the base plate and the multiplate, which manipulation handle in a first end is provided with a handle extending beyond the multiplate, and in an opposite end is provided with a hook portion, where a distal end of the hook, faces the base plate, and wherein a pivot is arranged between the multiplate and the manipulation handle, wherein the pivot is made by a bent section in the multiplate, wherein the bent section is approximately 90 degrees to the multiplate, towards the base plate, the bent section having an aperture, and wherein the manipulation handle is inserted through the aperture, and provided with arresting means on either side of the bent section, whereby the manipulation handle cannot be removed but pivots around a rim of the aperture in the bent section, wherein the provision of the pivot between the hook section and the handle enables up and down movement of the hook section by manipulating the handle such that when the handle is moved upwards towards the multiplate, the hook will move downwards, whereby the hook may be brought into engagement with one of the apertures or the upstanding ridges on the base plate, thereby arresting the multiplate's sliding ability in one direction relative to the base plate, wherein the electronic terminal is not directly supported by the base plate when mounted on the multiplate.

2. The height adjustable holder according to claim 1, wherein the multiplate's overside is provided with engagement means, configured to engage and hold the adapter plate or the electronic terminal.

3. The height adjustment holder according to claim 1, wherein a resilient device is provided between the manipulation handle and the multiplate, the resilient device being positioned between the bent section and the hook section, urging the manipulation handle away from the multiplate.

4. The height adjustment holder according to claim 1, wherein the base plate has a length and a width in a x-y plane, and wherein a portion along each longitudinal side of the base plate is bent an angle ß resp. −ß, relative to the x-y plane, and wherein the multiplate also has a length and a width in use in a second plane parallel to the x-y plane, wherein a portion along each longitudinal side is bent such that the bent portions of the multiplate are parallel with the bent portions of the base plate and the bent portions are overlapping, and wherein a low friction material is arranged in the overlap, whereby the base plate may slide relative to the multi plate, guided by the bent portions.

5. A method of adjusting a height adjustable holder according to claim 1, wherein the height adjustable holder is mounted such that the base plate and multiplate are at an angle different from horizontal, with the manipulation handle extending from the lower side of the multi plate, and wherein by urging the manipulation handle towards the base plate the hook portion of the manipulation handle disengages an aperture or ridge provided in/on the baseplate, such that the multiplate may be slidingly displaced relative to the base plate, and when a desired displacement has taken place the manipulation handle may be released whereby a resilient device will urge the hook portion into engagement with an aperture or a ridge, thereby locking the multiplate in position relative to the base plate.

6. The method according to claim 5, wherein the base plate has a length and a width in a x-y plane, and wherein a portion along each longitudinal side of the base plate is bent an angle ß resp. −ß, relative to the x-y plane, and wherein the multiplate also has a length and a width in use in a second plane parallel to the x-y plane, wherein a portion along each longitudinal side is bent such that the bent portions of the multiplate are parallel with the bent portions of the base plate and the bent portions are overlapping, and wherein a low friction material is arranged in the overlap, whereby the base plate may slide relative to the multi plate, guided by the bent portions such that the sliding movement is controlled and guided by the overlapping side portions, and facilitated by the low friction material providing a smooth displacement.

7. The height adjustable holder according to claim 1, wherein the electronic terminal does not contact the base plate when mounted.

8. The height adjustable holder according to claim 1, wherein the electronic terminal can be displaced along a full length of the array of apertures or of the plurality of ridges in a longitudinal direction when the electronic terminal is carried on the multiplate.

9. The height adjustable holder according to claim 1, wherein the multiplate is provided with an engagement bracket for receiving the adapter plate or the electronic terminal.

\* \* \* \* \*